United States Patent [19]
Agarwal et al.

[11] Patent Number: 5,825,677
[45] Date of Patent: Oct. 20, 1998

[54] NUMERICALLY INTENSIVE COMPUTER ACCELERATOR

[75] Inventors: Ramesh Chandra Agarwal, Yorktown Heights, N.Y.; Randall Dean Groves, Austin, Tex.; Fred Gehrung Gustavson, Briarcliff Manor, N.Y.; Mark Alan Johnson, Austin; Brett Olsson, Round Rock, both of Tex.

[73] Assignee: International Business Machines Corporation, Armonk, N.Y.

[21] Appl. No.: 619,456

[22] Filed: Mar. 20, 1996

Related U.S. Application Data

[63] Continuation of Ser. No. 217,533, Mar. 24, 1994, abandoned.

[51] Int. Cl.$^6$ .................................................. G06F 17/16
[52] U.S. Cl. .................................................. 364/736.03
[58] Field of Search .......................... 364/736, 736.03

[56] References Cited

U.S. PATENT DOCUMENTS

| | | | |
|---|---|---|---|
| 4,594,682 | 6/1986 | Drimak | 364/736 |
| 4,617,625 | 10/1986 | Nagashima et al. | 364/200 |
| 4,621,324 | 11/1986 | Ushiro et al. | 364/200 |
| 4,685,076 | 8/1987 | Yoshida | 364/736 |
| 4,712,175 | 12/1987 | Torii et al. | 364/736 |
| 4,725,973 | 2/1988 | Matsuura et al. | 364/736 |
| 4,761,754 | 8/1988 | Kinoshita | 364/736 |
| 5,010,477 | 4/1991 | Omoda et al. | 364/200 |
| 5,274,818 | 12/1993 | Vasilevsky et al. | 395/700 |

FOREIGN PATENT DOCUMENTS

| | | |
|---|---|---|
| 0085435 | 8/1983 | European Pat. Off. |
| 0195245 | 9/1986 | European Pat. Off. |
| 0517013 | 12/1992 | European Pat. Off. |

OTHER PUBLICATIONS

NEC Research and Development, No. 96, Mar. 1990, pp. 93–109, XP 000136298, "Mainframes and Their Related Products".

*Primary Examiner*—David H. Malzahn
*Attorney, Agent, or Firm*—Daniel P. Morris

[57] ABSTRACT

A matrix processing unit is described which permits high speed numerical computation. The processing unit is a vector processing unit which is formed from a plurality of processing elements. The Ith processing unit has a set of N registers within which the Ith elements or words of N vectors of data are stored. Each processing element has an arithmetic unit which is capable of performing arithmetic operations on the N elements in the set of N registers. Each vector of data has K elements. Therefore, there are K processing elements. A vector operation of the matrix processing unit simultaneously performs the same operation on all elements of two vectors or more. A subsequent vector operation can be performed within one machine cycle time after the preceding vector operation.

16 Claims, 5 Drawing Sheets

NUMERICALLY INTENSIVE COMPUTER ACCELERATOR

This is a continuation of application Ser. No. 08/217,533, filed Mar. 24, 1994 now abandoned.

FIELD OF THE INVENTION

This invention relates generally to the field of data processing systems. In particular, this invention relates to a data processing system for numerically intensive computing on a plurality of processors. More specifically, this invention relates to a multiple processor system in which N processors simultaneously execute a reduced instruction set instruction on an N element vector.

BACKGROUND OF THE INVENTION

The power of computing has grown, and continues to grow, rapidly. This increased computing power has provided users of the computing power new opportunities to use computers in new ways, and hence, generated more demand for increasing computer power. One area in which increased computing power is especially useful is the area of numerically intensive computing. Numerically intensive computing involves the computation of a limited set of operations on large amounts of data. Numerically intensive computing techniques are used in a wide variety of applications such as image processing, signal processing, artificial intelligence, or computer simulations of weather or fluid dynamics. The common problem facing numerically intensive computing techniques in these application is to compute the limited number of functions required on the large amount of data associated with each application in the minimum time possible.

Early prior art computer systems consisted of a central processing unit (CPU), memory, and an input/output (I/O) controller. The CPU executed a program which instructed the I/O controller to transfer or fetch data or instructions into and out of the memory and also processed data according to a varied instruction set. Processing the data included such operations as decoding the specific instruction that the CPU was to perform, executing the specific instruction, and returning the result to the memory. The CPU was not complicated in that it processed instructions from the list of instructions in a program one at a time. However, this type of CPU was slow because it only processed one instruction at a time. In response to the slow processing time, prior art systems introduced pipelining the processor. In a pipelined processor, various independent functions of the CPU occur at a single time for different instructions. For example, the processor's instructions to the memory to fetch data for one instruction may be occurring while the processor is decoding the operation code of another instruction. Pipelining does not speed up the execution of any one instruction but it does speed up the processing of a series of instructions because succeeding instructions start processing in the CPU before prior instructions have completed processing. In addition to pipelining, the prior art also recognized that a limited set of instructions are repeatedly used for numerical problems. As a result, the prior art introduced special processor functional blocks within the CPU for rapidly performing those limited set of instructions. For example, some CPU's included functional blocks for performing only additions, multiplications, or branches. These functional blocks performed these limited functions much faster than the main CPU and this increased the speed of processing numerical functions.

In the prior art processors which incorporated pipelining or separate functional units for limited instructions, or both, a single instruction stream operated on a single data stream. That is, each instruction operated on defined data to produce one calculation at a time. Such processors were called SISD, an acronym for Single Instruction Single Data. The problem with SISD type processors is that if a program required a segment of the program to be applied to a number of diverse elements, the program would have to loop through the segment many times in sequence. This was the situation for many types of numerical problems, and SIMD type processors were developed to help increase processor speed on these types of problems. A SIMD processor unit comprises a plurality of processing elements having the same functional capabilities which are all operating, on a single instruction at a time with each processing element operating on a separate data stream. Typical SIMD processor units include three primary components, an array of processing elements, a routing network, and a controller. In contradistinction, the processors, according to the present invention, do not use a routing network therefore resulting in a lower cost processor and in reduction in time to move data to and from main memory and the processing elements. The routing network communicates the results from any one processing element to any other processing element in the array which may require it The controller controls the operations of the array of processing elements and the routing network in response to instructions and data from the main CPU of which the SIMD processor unit is a part.

The problem with multi-processor SIMD type systems in that the system performance is limited by the ability of multi-processor array to obtain data from the computer memory system at a sufficiently fast rate and the ability of the main CPU to optimize the use of a large number of processors. In particular, building a memory system which supplies each processor in an array with data from main memory requires a memory bandwidth which is very high and therefore too expensive or impractical for most applications. Moreover, a routing network in which each individual processor communicates directly with other processors in the array degrades the overall performance of the array of processors. The prior art has attempted to solve these problems with limited success. In particular, the prior art has connected the plurality of processors within a processor array into a matrix in which processors only communicate with their several nearest neighbors. This arrangement increases the ability of nearest neighbor processors to communicate and therefore increases the overall performance of the processors when instructions require communication only between nearest neighbors. However, most instructions require communication between random processors and routing communications through nearest neighbors to random processors decreases the overall performance of the processor array. As a result, the nearest neighbor connection of processors may actually decrease the performance of the multiprocessor array depending on the number and type of instructions executed. The speed of communications between processors is increased when processors are connected into a hypercube type arrangement in which each processor connects directly to a multiple number of other processors. This type of arrangement decreases the need for communications between processors not directly connected together and will increase the performance of the processor array. However, the increase in processor array performance is still limited by the memory bandwidth associated with the processor array. The processor array can only execute instructions as fast as the data can be delivered to individual processors. The hypercube arrangement requires such a high memory bandwidth that implementation of such a memory system in combination with the hypercube arrangement is impractical in many computer systems.

For modern high performance computers, the performance is primarily limited by the cycle time of the machine. Parallelism is often used to increase the overall performance. It has been observed that it is very difficult to build shared memory parallel systems with a large number of processors. Recently, several distributed memory parallel systems have been built. The Intel Paragon, Cray T3-D, IBM SPI are examples of this class of machines. In general it is more difficult to write software and optimally utilize distributed memory systems with a large number of processors. These machines often get bogged down by communication bottleneck. Also, because of replication of most of the system components and additional cost and overheads of the communication network, the price performance ratio of these highly parallel machines is often not as favorable as that for the underlying uni-processor.

Two of the major considerations in a computing system according to the present invention are control of execution or instructions and the memory management. From the control consideration and the operating system point of view, it is highly desirable if only a single instruction stream is executed, and only a single image of the memory is maintained. In other words, from the operating system point of view, we would like the machine to look like a single CPU machine. An object of this invention is to define a system structure which achieves very high performance on a class of NIC (numerical intense computation) problems, while at the same time operating under the umbrella of "single instruction stream and memory map" model.

For modern high performance computers, the performance is also limited by the bandwidth available from the memory system. This invention also provides algorithmic structures which work with the above system structure to reduce the memory bandwidth requirements for a class of numerically intensive computing problems.

One simple measure of quantifying numeric intensity of a problem is to count the total number of flops (floating point operations) and divide it by the total number of data points (or amount of memory space needed) involved in the computing. Let us call this ratio as flops-to-data ratio. In short, we will denote this ratio as FDR. FDR can be calculated for the problem as a whole as well as for sub-problems encompassed by the problem. In general FDR for sub-problems is significantly lower than that for the entire problem. At the elementary scalar operation level FDR could be less than one. For most NIC problems, by appropriately blocking (algorithmically) the original problem into sub-problems which fit in various levels of memory hierarchy, FDR can be significantly improved. Again in general, if a larger memory space is made available at a given level, a higher value of FDR can be achieved. In a hierarchical memory system, the memory bandwidth requirements at a given level of memory is inversely proportional to FDR ratio at that stage. At the highest level (largest memory size) the BW requirements are least and as we progress to lower (and smaller) levels of memory, the BW requirements progressively increase. The exact numbers will depend on the problem, algorithm used, and the amount of computing resources available. In general, higher computing resources imply higher BW requirements. Below, we will provide algorithmic non-limiting examples where a large amount of computing resources can be optimally utilized without significantly increasing memory BW requirements. In general algorithms can be tailored to optimally utilize various levels of memory and their associated bandwidths.

OBJECTS OF THE INVENTION

It is an object of the present invention to manufacture an improved computing system.

It is another object of the present invention to manufacture an improved computing system for numerically intensive computing problems.

It is a further object of the present invention to manufacture an improved computing system having multiple processors.

It is still another object of the present invention to manufacture an improved computing system for faster execution of a limited number of instructions. It is still a further object of the present invention to manufacture an improved computing system for faster execution of a limited number of instructions without significantly increasing the memory bandwidth of the computing system.

It is still another object of the present invention to manufacture an inexpensive computing system for faster execution of a limited number of instructions.

SUMMARY OF THE INVENTION

A broad aspect of the present invention is a computing system having a parallel processor which simultaneously performs operations on groups of pairs of words of data to substantially increase the throughput of the computing system.

Another broad aspect of the present invention is a computing system which performs a subsequent vector operation within one cycle time of a preceding vector operation.

A more specific aspect of the present invention is a computing processor having a processor cycle time. The computing processor has K processing elements wherein K>1. Each of the K processing elements has a set of N registers wherein N>1 and an arithmetic unit. The Ith elements of each of the registers provides storage locations for an Ith vector register of vector length K. The computing processor has a means for performing at a predetermined cycle time a vector arithmetic operation between at least one of the N vectors and storing the results of the operation in one of the N vectors, wherein the vector arithmetic operation is performed by the K arithmetic units substantially simultaneously for all of the K elements of at least one of the N vectors. The computing processor has means for performing another vector operation in the next cycle time after the predetermined cycle time.

BRIEF DESCRIPTION OF THE DRAWINGS

These and other objects, features and advantages of the present invention will become apparent upon further consideration of the following detailed description of the invention when read in conjunction with the drawings and figures.

DETAILED DESCRIPTION

After having addressed the question of memory BW, the next issue is the organization of the computing itself so that for a given cycle time of the machine, a large amount of computing can be done. One measure of performance is flops per cycle (FPC). For traditional scalar architecture such as the IBM S/390, several cycles are needed to generate a flop. First the operands need to be fetched into registers (or floating point unit), this is followed by a pipelined arithmetic, and then a store back of the result into main memory. FPC for such a system is typically a small fraction. Machines like IBM RS/6000 have multiple functional units, each doing a specified function in a coordinated fashion resulting in 2 or more flops per cycle under ideal circumstances. Vector machines also achieve similar results by hiding the pipeline latencies in a long vector.

In a traditional vector architecture, identical operations are performed on a set of independent operands. The number of independent operands is called the vector length. On current vector machines, these operands are processed sequentially by a pipelined arithmetic unit. On some machines, to increase the throughput (FPC), multiple arithmetic units, called arithmetic pipes, are provided. Generally, as more pipes are added, the memory BW is also increased accordingly.

An invention herein is a system structure where each set of operands (each element of the vector) is processed by an independent arithmetic unit. In that case, the number of arithmetic units that can be utilized equals the vector length. In S/390 terminology, it is called vector section size (VSS or K). The number of cycles required for a vector execution will equal the pipeline length. In a pipe an operation such as an addition is typically partitioned into two or more step where each step is done in one machine cycle. The pipeline length delay is the delay in machine cycles between the input to the pipe and the output of the pipe with the final result of the operation. However, because of the pipeline nature of the arithmetic unit, by proper instruction scheduling, it should be possible to feed a set of "vector operands" and obtain a "vector result", every cycle. This is a form of SIMD (single instruction, multiple data) parallelism. However, it is very different from traditional SIMD machines, such as Thinking Machine Corporation CM-200, CM-5, etc. For such an architecture, maximum flops per cycle (FPC) that can be achieved is 2*VSS (a multiply-add operation is counted as 2, flops). Compared to the current vector machines, this is a very high level of performance. Furthermore, the level of performance is parameterized by the parameter VSS or K. Theoretically, this is the best performance that can be achieved. To actually obtain this level of performance requires feeding data and storing results from the arithmetic units at a very high rate. This is discussed next.

In a traditional vector architecture, the operands can come from either a set of vector registers or memory. In a RISC scalar architecture, all operands are first loaded into a set of scalar registers. The arithmetic unit gets all its operands from registers and stores all results back to registers. This is a two step data path to/from memory to the arithmetic unit. In the preferred embodiment of the present invention the processing elements use a RISC vector architecture where all arithmetic units talk (get their operands from and store their results into) only to vector registers which in turn talk to the memory system. The RISC architecture is described in all the articles of the IBM Journal of Research and Development, Vol. 34, Number 1, January 1990. This immediately suggests another level of decoupling. An arithmetic unit needs to talk only to those elements of the vector registers which have the same index number as the arithmetic unit. For convenience, we can number the arithmetic units from 0 to K-1. Let us assume that there are N (another parameter) vector registers. Then, an arithmetic unit needs to talk to only N scalar registers. For best access, it is expected that these registers and the arithmetic unit will be on the same chip. We call this combination of arithmetic unit with registers a processing element (PE) (with total number of. elements=N*K) N vector registers are distributed over K PEs. This aggregate of K PEs is termed NICA (Numerically Intensive Computing Accelerator). If data resides in NICA registers, it can achieve a peak performance of 2*K flops per cycle.

Figure 1:
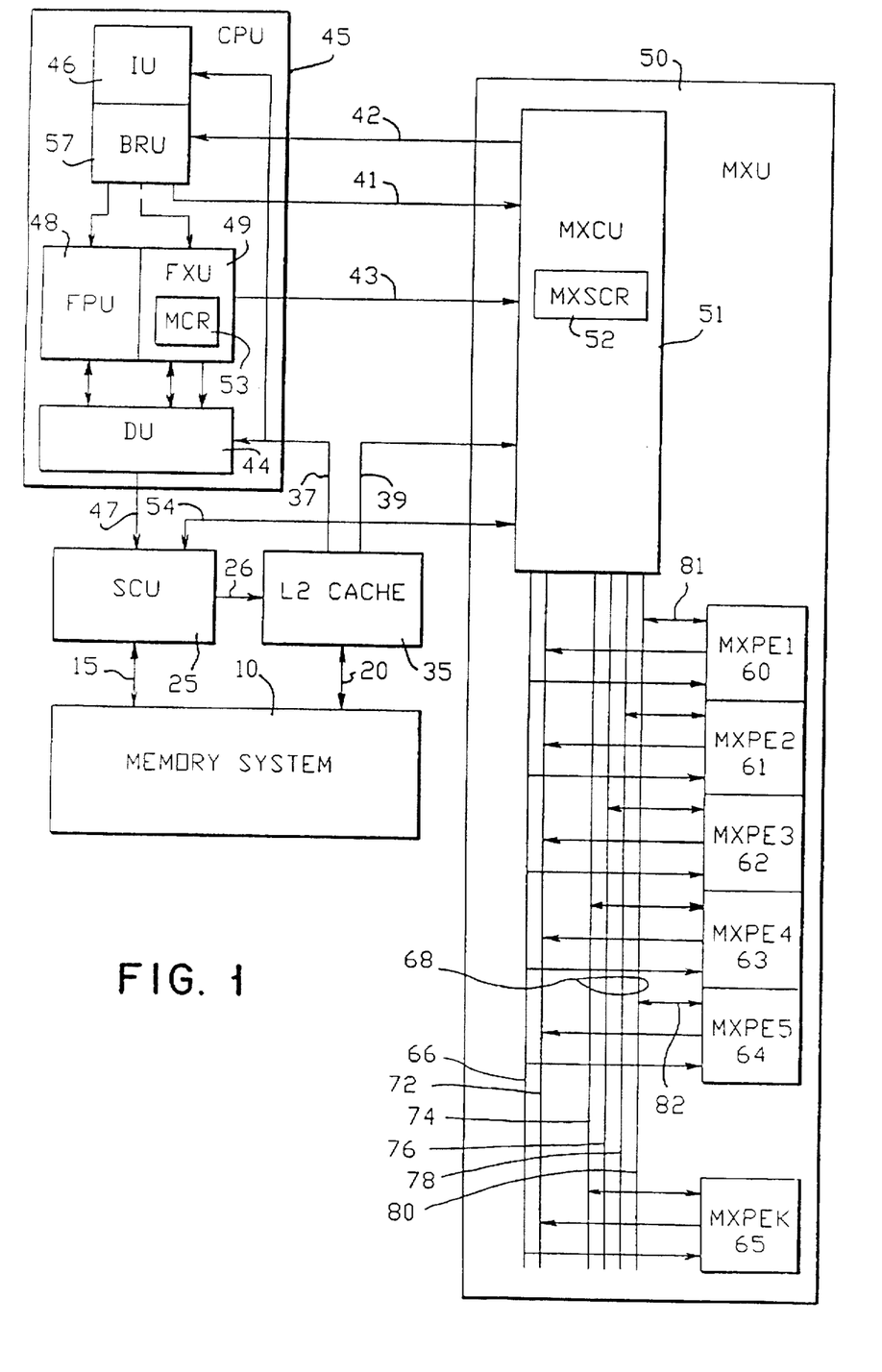
FIG. 1 illustrates a block diagram of a data processing system to an embodiment of the present invention.

FIG. 1 illustrates one embodiment of a computer system using a matrix unit (MXU) (or vector processor) according to the present invention. In this computer system, a central processing unit (CPU) 45 and the MXU 50 are coupled to main memory 10 through a storage control unit (SCU) 25 and a cache buffer memory (L2 cache) 35. The CPU 45 is coupled to the MXU 50 through an MXU instruction bus 43, an MXU address and count bus 42 and MXU storage request ID bus 41. The SCU 25 is connected to the main memory 10 by a memory address bus 15 and the SCU 25 is connected to the CPU 45 by an address bus 47. The cache 35 is connected to the main memory 10 by a memory data bus 20. The cache 35 is connected to the CPU 45 by a CPU data bus 37 and to the MXU by a MXU data bus 39. The CPU 45 is a general purpose processor composed of a branch unit (BRU) 57, a floating-point unit (FPU) 48, a fixed-point unit (FXU) 49, a level 1 instruction cache (IU) 46, and a level 1 data cache unit (DU) 44. The IV 46 and DU 44 are optional and only employed for performance reasons.

The BRU 57 provides the control flow (determines which instruction is to be executed next) for the CPU 45 and MXU 50. The BRU 57 generates the address of the memory location of the next instruction to be executed. If the instruction is present in the IU 46 (it has recently been accessed), the instruction is fetched from the IU 46. If the instruction is not present in the IU 46, the BRU 57 generates a request for the location and sends the request to the SCU 25 via the L2 cache address bus 47. The SCU 25 contains a directory of the contents of the L2 cache 35. If the requested memory location is present in the L2 cache 35, then the SCU generates the controls necessary to access the location in the L2 cache 35 and communicates the access controls to the L2 cache via the L2 control bus 26. The L2 cache 35 performs the access and sends the contents of the location to the CPU 45 on the CPU data bus 37. If the requested address is not present in the L2 cache 35, the SCU 25 generates a memory access request and sends the request to the memory system 10 on the memory address bus 15. The memory system accesses the requested location and returns the contents of the requested location the the L2 cache 35 on the memory data bus 20. The L2 cache 35 returns the contents of the requested memory location to the CPU 45 on the CPU data bus 37. Upon receiving the contents of the requested memory location the IU 46 forwards the instruction to the BRU 57 for dispatch and execution.

The BRU 57 examines the next instruction to be executed and dispatches the instruction to the appropriate execution unit. Branch instructions are executed by the BRU 57. Scalar integer instructions are executed by the FXU 49. Scalar floating-point instructions are executed by the FPU 48.

Vector instructions are executed by the MXU 50. Memory access instructions are executed jointly by the IFXU 48 and the subject execution unit, where the FXU 48 generates the address of the load or store instruction and submits the request to the DU 44 (for FXU and FPU memory accesses) or to the SCU 25 (for MXU memory accesses). Vector instructions are dispatched by the BRU 57 to the MXU 50 on the MXU instruction bus 41. Vector memory access instructions are dispatched to both the MXU 50 and the FXU 49.

As mentioned above, vector memory access instructions are executed jointly by the FXU 49 and MXU 50. The IXU 49 computes the address of the memory access and forwards the memory request to the DU 44. The DU 44 performs a cache directory lookup to ensure the location requested is not present in the L1 data cache. If the memory location is present, that location is first flushed out to the L2 cache 35 to make it visible to the MXU memory access. Then the DU 44 forwards the memory access request to the SCU 25. Similar to instruction memory accesses, the SCU interrogates the L2 cache directory to determine if the requested memory location is present in the L2 cache. If the location is not present, the memory location is requested from the memory system 10 and the contents are returned on the memory data bus 20 and placed in the L2 cache. For MXU load instructions, the contents of the requested memory location are returned to the MXU 50 on the MXU data bus 39. The SCU 25 informs the MXU 50 that load data is available on the MXU data bus 39 using the MXU-L2 cache control bus 54. For MXU store instructions, the SCU 25 and L2 cache 35 wait until the subject store data is presented on the MXU data bus 39 by the MXU 50 at which time the data is placed into the addressed memory location in, the L2 cache 35. The MXCU 51 informs the SCU 25 that store data is available: on the MXU data bus 39 using the MXU-L2 cache control bus 54.

For vector instructions that are dispatched on the MXU instruction bus 41, the matrix control unit (MXCU) 51 receives the instruction to be executed and places the instruction into an instruction queue for subsequent execution. When all required control information has been received (memory access instructions use the lower address bits for data alignment and element count from the FXU 49) the instruction drops into execution in the MXCU 51. The element count is contained in the Matrix Count Register (MCR) 53 and specifies the number of elements to be loaded or stored by the vector memory access instruction. From there the MXCU 51 sets up the appropriate command (a formatted version of the original instruction) and a processing element mask (identifying which MXPEs are to participate in executing the instruction) and dispatches that command (or series of commands) to the array of matrix processing elements (MXPE1–MXPEK) on the MXPE command bus 70 for execution. For vector load instructions, the MXCU 51 receives the subject data from the L2 cache on the MXU data bus 39 and routes the data to the appropriate target MXPE data bus (or buses) to forward to the target MXPE (or MXPEs). For vector store instructions, the MXCU 51 eventually receives the subject store data from the source MXPE (or MXPEs) on its (their) respective MXPE data bus (or buses), routes the store data to the appropriate alignment and forwards the data to the L2 cache 35 on the MXU data bus 39. For vector arithmetic instructions, the MXCU 51 receives the result status (exception indications) from the MXPE(s) on the MXPE status bus 72. This status is captured in the matrix status and control register (MXSCR) 52 and forwarded to the BRU 57 on the MXU status bus 42 in the form of an interrupt request in the presence of maskable exception conditions.

Every MXPE receives the command on the MXPE command bus 70. The MXCU also provides a mask with each command, identifying which MXPE(s) are to participate in the execution of an instruction. A subset of MXPEs can be selected due to a number of factors such as an element count less than the number of MXPEs, an unaligned memory access, or the program explicitly specifies a subset in the MXSCR's 52 start and end range fields. MXPEs that are masked off discard the instruction. MXPEs that are not masked off receive and queue the instruction for execution. For vector load instructions, the load data for selected MXPEs is received on their respective MXPE data bus with the load command. The selected MXPE(s) then place the load data into the target register. For vector store instructions, each selected MXPE accesses the source register, presenting the data on its MXPE data bus. For vector arithmetic instructions, each selected MXPE performs the requested arithmetic function in an SIMD fashion, obtaining the source operand(s) from the matrix registers (MXRs) and placing the result into the target MXR. Status for the arithmetic operation is placed into each of the selected MXPE's matrix condition register (MXCR) and a summary of the exceptions that occur are forwarded to the MXCU 51 on the MXPE status bus 72.

Figure 5:
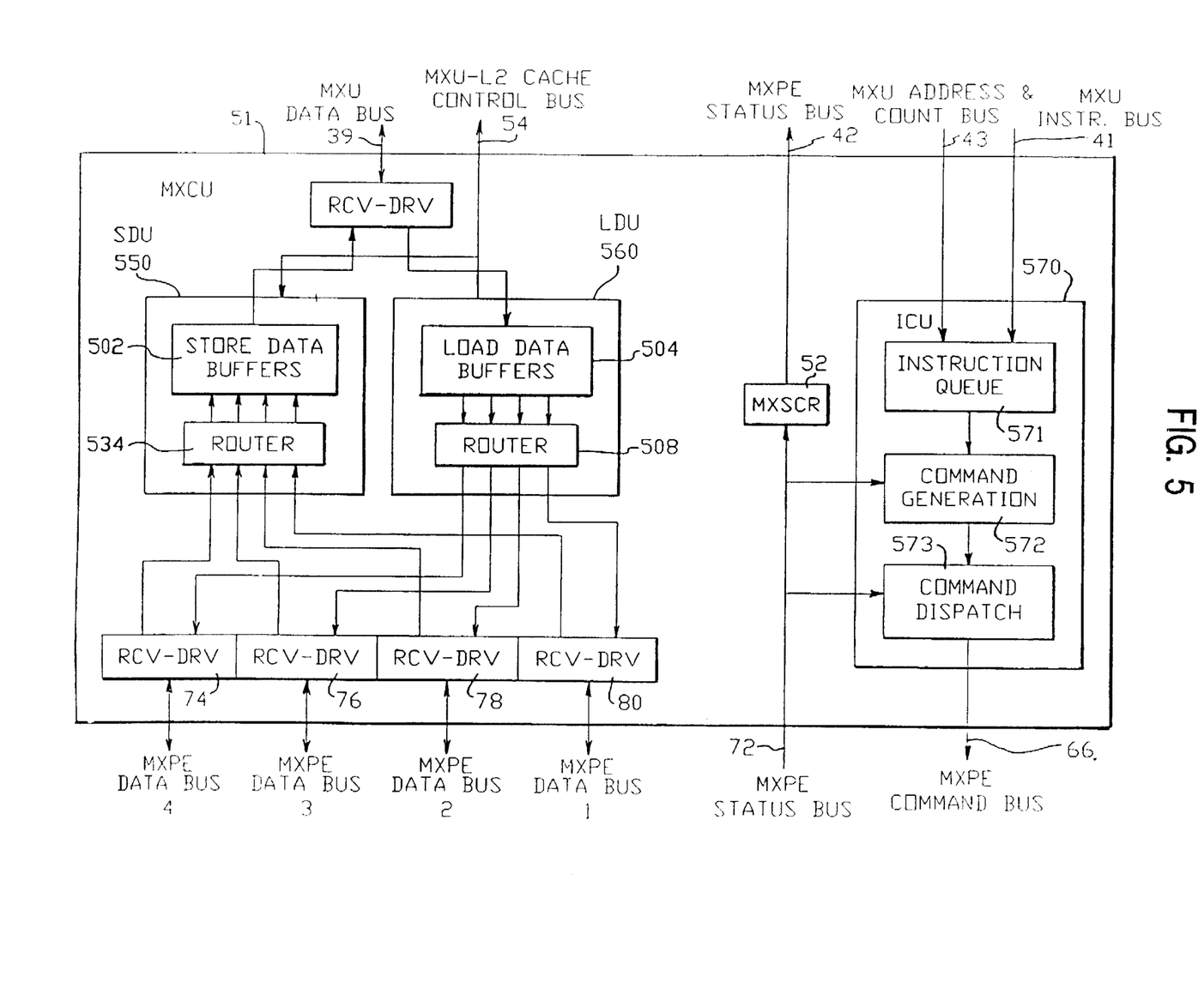
FIG. 5 shows a more detailed schematic diagram of the matrix control unit, MXU, of the vector processor of FIG. 3.

FIG. 5 shows a more detailed view of the organization of the MXCU 51. The MXCU 51 is made up of three main components, an instruction control unit (ICU) 570 a load data unit (LDU) 560 and a store data unit (SDU) 550. The ICU 570 is composed of an instruction queue 571, command generation 572, and command dispatch 573. The instruction queue 571 is used to buffer MXU instructions that are dispatched from the CPU 45 until such a time all the prerequisite control information for the instruction has been received. An example of such prerequisite data is the element count for load and store instructions, indicating to the MXU 50 how many memory accesses are being set up by the CPU 45. Once all required prerequisite data has been collected the instruction proceeds to command generation 572. Command generation evaluates the subject instruction and related control information and sets up the appropriate command to be dispatched to the MXPEs that will properly and correctly execute the specified function. Such setup includes generating an MXPE mask based on the start and end range settings of the MXSCR 52 or the address alignment and element count of a memory access instruction. Any special register addressing modes can also be implemented in this stage. Command dispatch 573 assesses the current state of the MXU 50 to determine if the next command can be dispatched to the MXPEs. Performance enhancing techniques can be employed in this stage such as out-of-order dispatch if register dependencies will permit. The LDU 560 provides data buffering 504 for MXU load data that arrives before the load instruction is ready for execution. Performance enhancing techniques such, as supporting out-of-order return of load data can be supported here. The LDU 560 then provides a network of multiplexors 508 intended to support routing load data to any arbitrary MXPE data bus port. The SDU 560 provides a network of multiplexors 534 intended to support routing store data from any arbitrary MXPE data bus port. A store data buffer 502 is provided to allow for MXU data bus 39 busy periods without stalling the MXPE data buses 74, 76, 78, 80.

Figure 2:
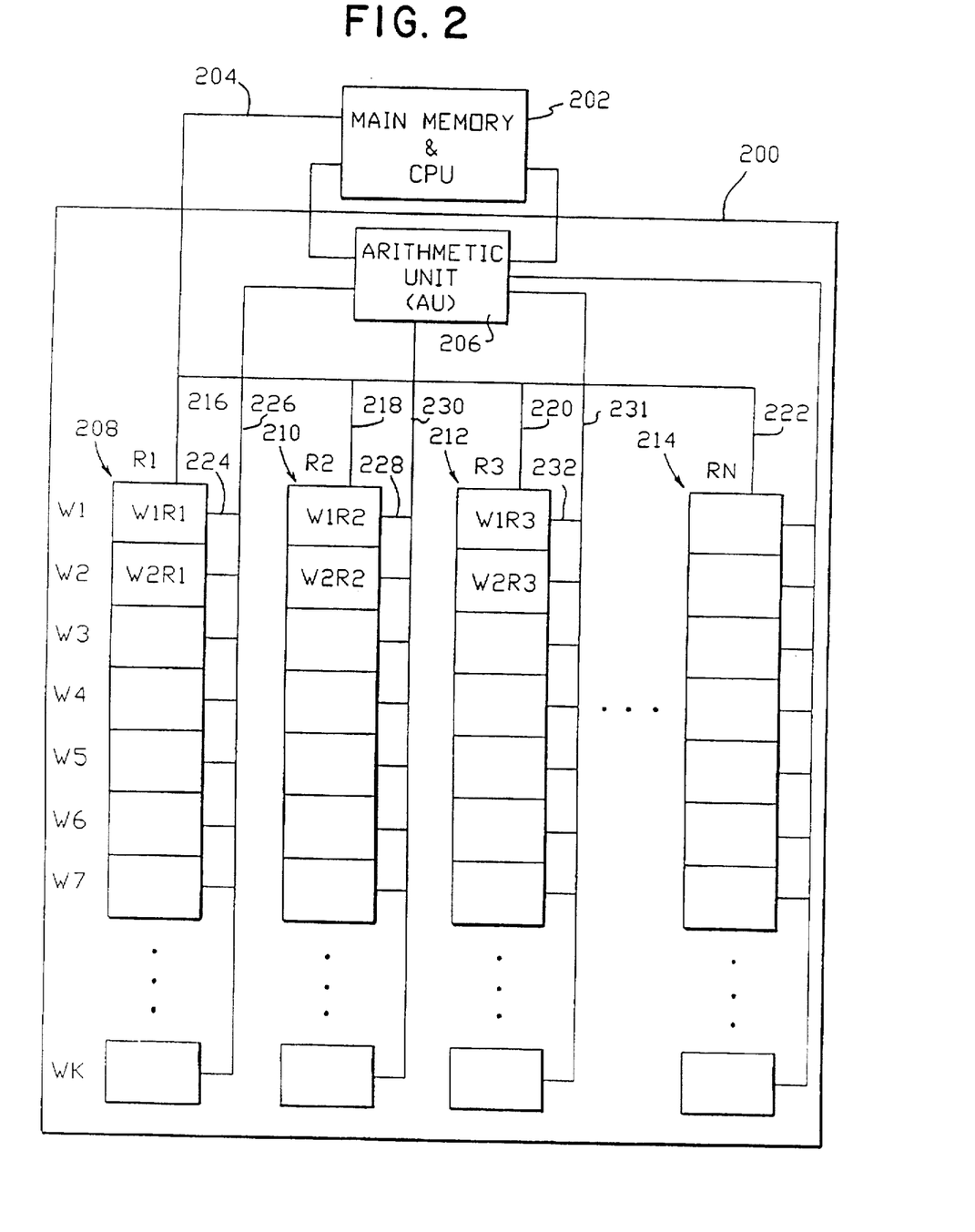
FIG. 2 shows a schematic diagram of commonly available vector processors.
Figure 3:
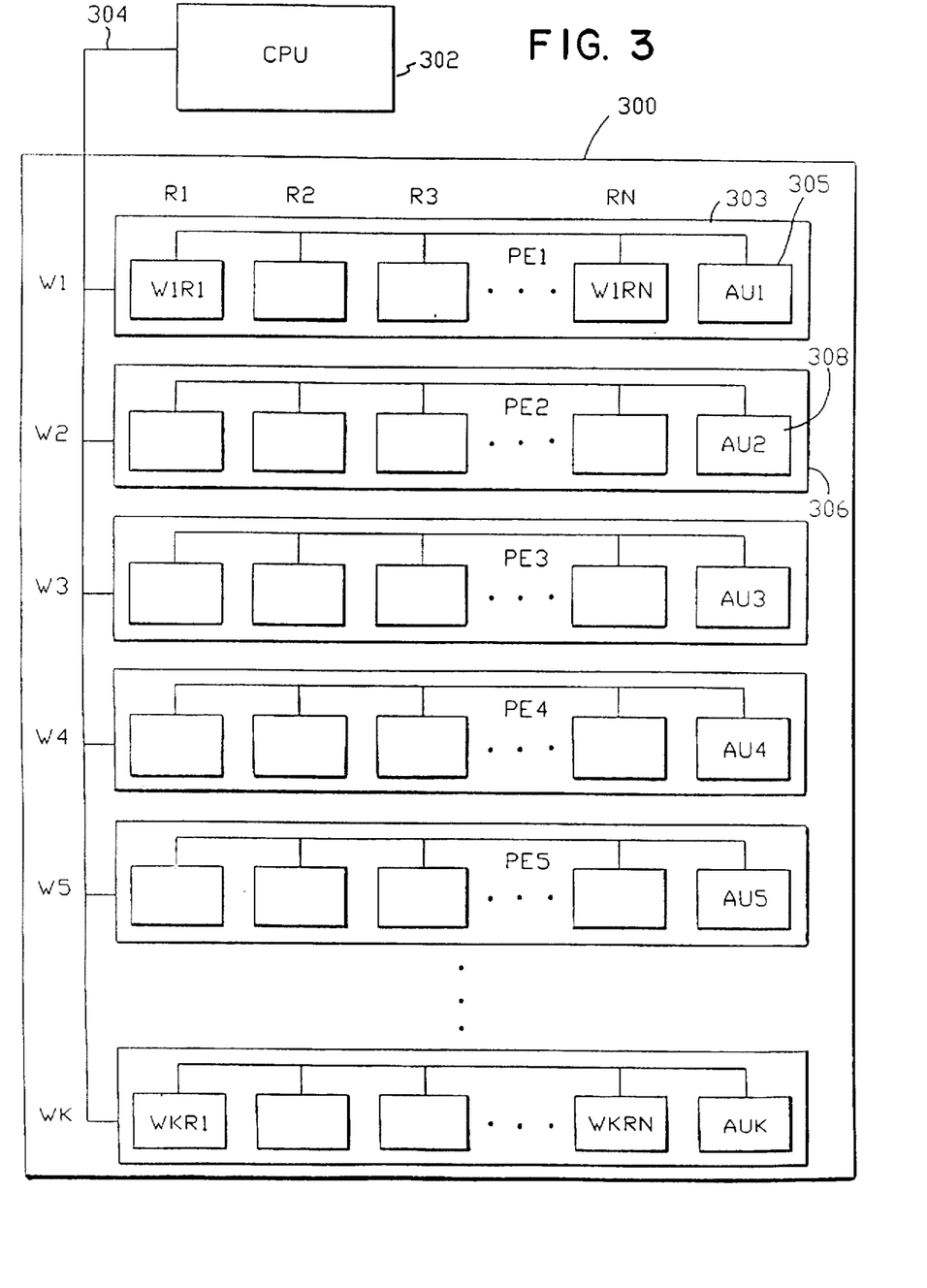
FIG. 3 shows a schematic diagram of a vector processor according to the present invention.

The MXU 50 according to the present invention provides certain distinctive advantages over currently available vector processors. To more easily understand this advantage, FIG. 2 shows a schematic representation of a currently available vector processing unit and FIG. 3 shows a schematic diagram of a matrix. processing unit according to the present invention. A comparison of FIGS. 2 and 3 and the description herein will point out the differences and advantages of applicant's invention.

FIG. 2 shows a schematic diagram of a vector processing unit 200 which receives data and instructions from a main memory and central processing unit of computing system 202 via data and control lines 204. Vector processing unit 200 contains at least one arithmetic unit (AU) 206. The arithmetic processing unit 206 can perform operations such as addition, multiplication and logical operations and the like. The vector processing unit 200 has a plurality of vector registers R1 to RN wherein N is greater than 1. Thus, the system has N vector registers. Four of these registers are shown in FIG. 2 as registers 208, 210, 212 and 214. Each register R1 to RN contains words W1 to WK wherein K is greater than one and wherein each word has more than one bit of data. Thus each register contains K words. K is typically something like 64–256 words. N is typically 8–32 registers. Data or instructions are transferred from the main system 202 by means of data lines 204, 216, 218, 220 and 222. Each word is transferred to the word locations W1 to WK sequentially until each register is filled with data K words to form a vector of length K. A command is executed by AU 206 such as to add register 208 to register 210 and put the value into register 212. The words of each corresponding register location are added sequentially and the result deposited into the corresponding word location in register 3. For example, the word in word location W1 of register R1 that is word location W1R1 is transferred to the AU through data bus 224 and 226. The word in word location W1 of register R2, that is word location W1R2, is transferred to the AU 206 through data bus 228 and 230. The operation of W1R1+ W1R2 is performed in the AU 206 and the result is transferred through data lines 231 and 232 into word location W1 of register R3, that is W1R3. The next operation is to transfer the word W2R1 to the AU 206 and to transfer the word W2R2 to the AU 206 which performs the operation of W2R1+W2R2 and deposits the result to word location W2R3. Sequential transfers are made from the word locations on each register R1 R2 from word location W1 to word location WK. Thus, the arithmetic operation and the vector processing unit 202 can have more than one arithmetic unit AU so that more than one transfer and more than one arithmetic operation can be done at a time. Typically, commonly used matrix vector processing units have no more than four arithmetic units AU, which means that four operations can be done at one time. One vector operation is the arithmetic: combination of one vector such as in register R1 with the vector in register R2, such as addition, multiplication or a logical comparison and a transfer of the result into another vector such as R3. The number of machine cycles for such a vector instruction or operations is equal to the start up cycles for a vector instruction which is typically for such commonly available vector processors from 5–10 machine cycles plus the vector length K divided by the number of arithmetic units AU. The arithmetic unit is also referred to in the art as an arithmetic pipe. The minimal cycle time for a vector operation in such a vector processor is when the number of pipes is equal to the vector length, that is each word location such as W1 through WK has a pipe or an arithmetic unit associated with it. In such a case the cycle time per vector instruction is equal to the start up time for a vector operation which is from 5–10 machine cycles+1. The maximum number of cycles per vector instruction occurs when the number of pipe equals to 1, in which case the number of cycles per vector instruction is equal to the start up cycles which is from 5–10 machine cycles plus the vector length K. Currently available vector processing machines schematically shown in FIG. 2 cannot have K processing units 206 since the data band width between computing system 202 and the vector processing unit 200 is insufficient to be able to supply data or instructions fast enough to utilize the capability of K processing units AU 206.

An enhanced bandwidth memory would be needed to utilize the K processing units 206 in order to achieve the minimum time or 5 to 10 cycles between vector operations. If Q is the bandwidth for one processing unit 206, the bandwidth must be K*Q for K processing units 206. Such an enhanced bandwidth memory requires greatly increased complexity and thereby cost. In contradistinction, processors, according to the present invention, do not need enhanced bandwidth memory to achieve one cycle time between vector operations and can achieve this with a bandwidth of Q.

Vector operations are performed on at least one (typically two or three) vectors such as the negative inverse or absolute value of one vector. addition or multiplication of two vectors or combinations or these arithmetic operations. Vector operations can be on more than two vectors such as the operation multiplying two vectors and adding a third vector which are done in one vector operation.

A vector processing unit, according to the present invention, or matrix processing unit 300 is schematically shown in FIG. 3 as 300. Processor unit 300 receives data and instructions from computing system 302 via data and control lines 304. There are N registers R1–RN, corresponding to N vectors and there are K words in each of these registers W1–WK for a vector length of K. All of the first word locations W1 of each of the registers R1–RN are contained within processing element 1 (PE1) designated as 302. The processing element 302 contains an arithmetic unit AU1 304. Correspondingly, the second word W2 of each of the registers R1–RN are contained in processing element PE2 designated as 306.

Processing element 306 contains arithmetic unit AU2 designated as 308. Correspondingly, each word element (W1 where I is to K) of each of the vectors is contained within a processing element which contains its own arithmetic unit. Each word element W1 is contained in a resister having M locations to store M bits of data for an M bit word. Thus, each PE has N registers of M bits. Since the N vectors each having K words forms a KXN matrix of words. Therefore, the processor of FIG. 3 is referred to herein as a matrix processor.

Returning to FIG. 1, matrix unit 50 includes the matrix control unit MXCU 52 and K processing elements MXPE1 through MXPEK. Four of these matrix processing elements are identified by numerals 54, 56, 58, 60, 62 and 64. The matrix control unit MCXU element 52 is connected to each of the matrix elements MXPE1 through MXPEK through command bus 66 and a plurality of data buses 68. The command bus 66 carries commands from the matrix control unit 52 to each of the processing elements MXPE1 through MXPEK. In FIG. 1 for data control 68 are shown as elements 70, 72, 74 and 76. As shown in FIG. 1 some of the data control buses 68 can be shared between more than one matrix processing element (MXPE), for example, data control bus 76 is shared between matrix processing element MXPE: and processing element MXPE5 as indicated by data control lines 80 and 82 respectively. The vector registers 402 correspond to registers of the single processing element 302 of FIG. 3, for example, word locations W1R1 through W1RN.

FIG. 5 shows a schematic diagram of the matrix control unit (MXCU) of FIG. 1. An instruction is received from the MXU 50 instruction bus 43 by control unit 500 which determines, based on the type of instruction how to handle it which is either to store data into store buffer 502 or into the load buffer 504 and arithmetic instruction. Data is transferred to and from the MXU 50 via the CPU data bus 39. Data coming in along CPU data bus 39 goes to multiplexer 504 which upon receiving information from the CPU 45 routes the data along bus 506 to load buffer 504. The data in load buffer 504 is partitioned by switch 508, into data paths 510, 512, 514, 516. Corresponding to the data buses 68 of FIG. 1. Each data path 510, 512, 514 and 516 goes to a multiplexer 518, 520, 522, 524, respectively, and from the multiplexers the data is transferred down the data buses 70, 72, 74 and 76. From the data buses 70, 72, 74 and 76 the data is transferred into the matrix processing elements MXPE1 through MXPEK. Correspondingly, when data is transferred from the matrix processing elements MXPE1 through MXPEK the data is transferred through the data busses 70, 72, 74 and 76 into the multiplexers 518, 520, 522 and 524, respectively, and therefrom along data lines 526, 528, 530 and 532, respectively, through switch 534 from which the data is transferred into store buffer 502 through data line 534 through multiplexer 504 back through data bus 39 to CPU 45 of FIG. 1. The multiplexer 504 has a two way input, the data bus 39 an two one way data lines 534 and 506. The other multiplexers 578, 520, 522 and, 524 function similarly.

Figure 4:
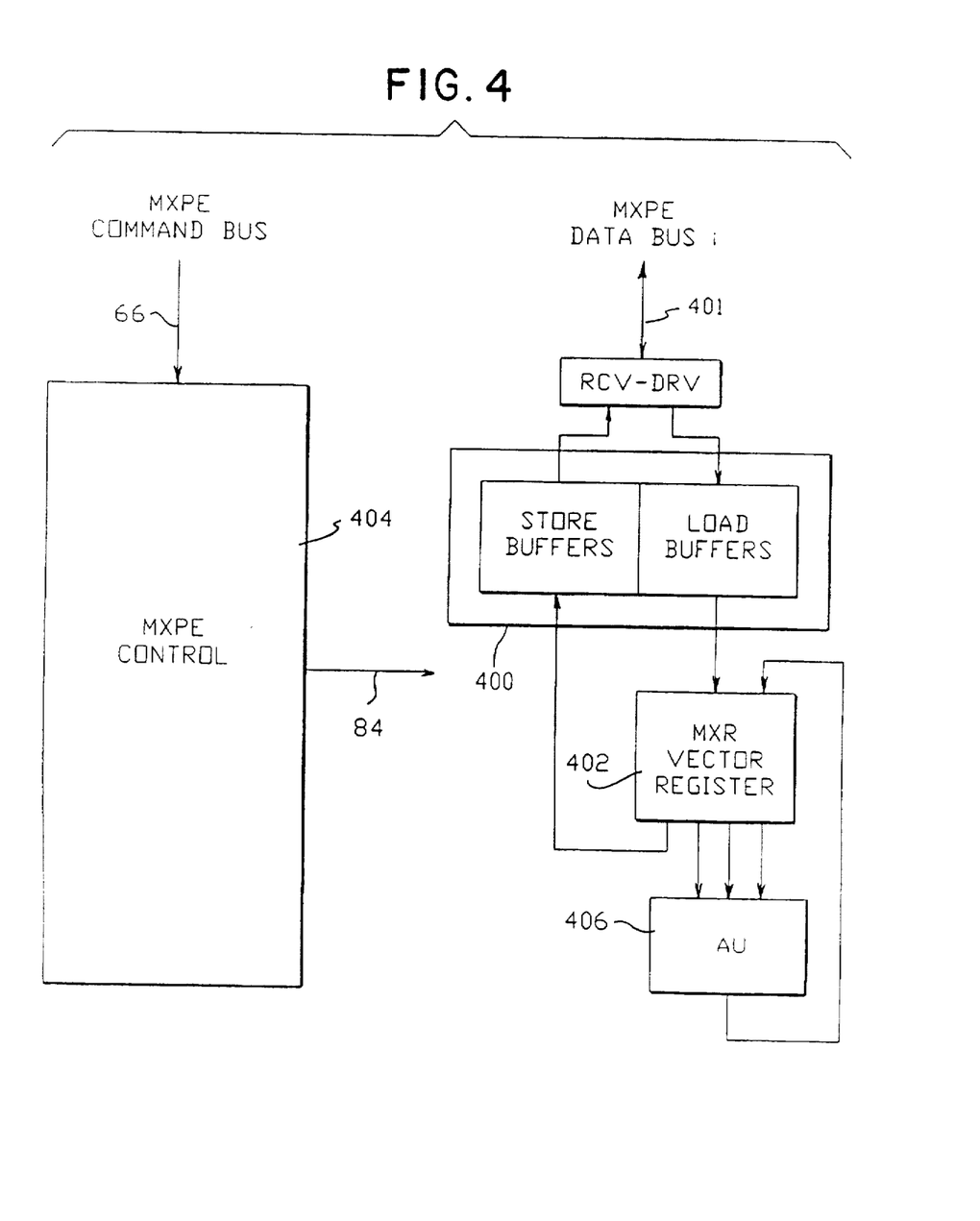
FIG. 4 shows a more detailed schematic diagram of one of the processing elements, MXPE of the vector processor of FIG. 3.

FIG. 4 shows in greater detail a schematic diagram of one of the MXPEs of MXU 50 of FIG. 1. Data bus 401 can be any of the data buses 74, 76, 78, or 80 of FIG. 1. How NICA is going to talk to rest of the system (memory) will now be described. One key objective of the matrix unit according to the present invention is to reduce the memory BW bandwidth requirements. This can be achieved by a significant reuse of data loaded into the NICA registers. Therefore, the design point with respect to the BW (band width) between NICA and memory should be significantly less than a vector load/store (K ops) per cycle. We expect vector loads/stores to happen only at a rate of once in many cycles. With this assumption, we can break up data transfers between NICA and the system into two components. The first component is an asynchronous transfer between the system and a NICA load/store buffer (LSB) 400 and the second component is a synchronous (SIMD) transfer between LSB 400 and NICA vector registers 402. Just like vector registers, the LSB 400 is also distributed across all MXPEs of MXU 50. The number of locations provided per MXPE in LSB is another design parameter. For a vector load, the system calculates the addresses of the operands in memory, fetches them and tags the incoming data with the index of the destination MXPEs, and puts them on a bus (for higher bandwidth, multiple buses can be used, with each bus connected only to a subset of MXPEs). The destination MXPE, latches the incoming data and puts it in the designated location of the LSB 400. When all MXPEs have received their data, the controller 404 initiates a SIMD transfer of data from LSB 400 to the designated vector register(s). The vector store works similarly but in reverse. Because of data reuse, it is expected that vector load/stores will be infrequent, and NICA will continue to do register to register RR vetor arithmetic on data in registers.

The following is an exemplary list of enhancements. Some or all of these ideas can be utilized in NICA.

A set of "scalar registers" are made available to all MXPEs through a separate scalar register bus. The bus is fed from a pool of scalar registers and all MXPEs are connected to it through a separate "scalar port" on each MXPE. This bus can be used to provide scalar constants to the arithmetic units of all PEs. This path can also be used for fast loading of a constant in a vector register.

Multiple PEs can be fabricated on a single chip/module. This has the advantage that I/O pins for all buses can be shared between PEs.

A set of M one bit vector mask or condition registers can be provided. These are again distributed across all PEs with each PE having a set of M scalar, one bit mask or condition registers. These registers can be set by compares or condition code of arithmetic operations. They can be used to implement, conditional arithmetic and data movement within a PE as well as data movement between PEs and the system. These bits themselves can be transferred back and forth between system and NICA. A separate K bit wide parallel bus can be used for bit transfers between vector condition registers and system. Each PE gets one bit of this parallel bus. If these mask bits are used to control data transfers between NICA and the system, then availability of this bus to the controller will help in fast and advance processing of the control data for the transfer. Mask vectors can also be manipulated by one bit Boolean operations.

Provide pack/unpack operations (for example pack two short precision operands as a long precision operand), so that short precision data can be transferred more efficiently over the bus. This will help in efficient utilization of available memory and bus BW.

The range of MXPEs participating in a SIMD vector instruction can be controlled by a "set vector range" instruction which specifies the beginning and ending index of active MXPEs. Even within this range, the target is updated only if the specified mask bit (one of the M mask bits) in the corresponding MXPE is "1".

For NICA to be applicable in solving a NIC problem, there are two key requirements: vectorization and data reuse. Most traditional vector operations can be implemented on NICA in a SIMD fashion. However, there are some exceptions. Those vector operations which require interaction between different elements of a vector can not be done in a SIMD fashion. An important example of such an instruction is vector accumulate (multiply-accumulate is similar to accumulate). In accumulate, we do sum reduction or a vector. Because of the arithmetic pipeline, even on a vector machine this is not very efficient. In accumulating a very long vector, every eighth (for example) element of the vector is accumulated in one of the accumulators. This phase of the operation is completed at the full vector speed. This is followed by a "sum partial sums" operation, which is done in the scalar mode. Accumulate (or multiply-accumulate) can also be implemented on NICA if the partial sum number is made equal to K. Then for a very long vector, most of the computing will be done in high performance SIMD fashion. Only the last "sum partial sum" phase will need scalar computing. Often most algorithms can be reformulated to avoid multiply-accumulate operations and instead multiply-add operations (which can be done in SIMD mode) can be used.

Another operation which is not amenable to SIMD computing is finding maximum or minimum of a vector. Then again for long vectors, SIMD vector compares can be used to reduce the problem size to K. Thus, most of the work can be done in high performance SIMD mode.

As mentioned above, vectorization is a prerequisite in using NICA. Most NIC applications vectorize at either inner loop or outer loop level. For NICA to be very effective, we need significant reuse of data brought into vector registers. Reuse is related to Flops to data ratio (FDR). By blocking the original problem at some level, for many problems FDR can be significantly improved. One useful technique is outer loop vectorization, where the inner loop(s), or a subblock of these, fits in NICA registers. Then outer loop is blocked with a block size of K and each index of outer loop is executed on a separate PE, with all inner loop(s) computation taking place within a PE. This is a very common form of outer loop vectorization/parallelization. Many parallelizing compilers use this technique to distribute computing across many parallel processors. Many problems which can not be vectorized can often be parallelized. For example, in seismic computation, a large amount of computing is done in solving multiple systems of complex tri-diagonal equations. These can be implemented on NICA with very large gain in performance. A large amount of seismic computing is trace based and can often be parallelized across the traces.

An extension of FORTRAN called FORTRAN-90 has been defined. It provides facilities to do array arithmetic. Programs written in FORTRAN-90 can be easily compiled for NICA.

LAPACK is a public domain software to do linear algebraic computations. It replaces LINPACK and EISPACK packages and significantly enhances them. It is being written for very high performance on most currently available computers. Because of its high performance, most users of linear algebra subroutines as well as other commercial software packages such as NAG, are migrating to LAPACK. The key idea behind the LAPACK project is that high performance can not be achieved unless most computing is done in BLAS-3. BLAS-3 is a set of linear algebra kernels which typically do order of $N^{}3$ computing on order of $N^{}2$ data points. LAPACK code is portable and makes use of tuned (for the specific machine) BLAS-3 kernels provided by the computer manufacturers. This idea and software package is being further extended to shared memory parallel processors as well as MIMD machines. It is expected that a tuned set of BLAS-3 routines will be developed for NICA. Then user code with LAPACK subroutine calls will automatically get the performance boost from NICA without any effort on the part of the user.

BLAS-3 routines in turn do most of the computing in DGEMM (matrix-matrix, multiplication with update). The computing which is not done in DGEMM is similar except that it is done on triangular matrices. In this section, we will show how DGEMM can be implemented very efficiently on NICA.

DGEMM does the following computing: $C \leftarrow C + A*B$

It is assumed that there is some outer level blocking on C such that at a time, we are computing on a block of C of size K by P, where P is less than N, the number of vector registers available in NICA. In that case, this block of the C matrix fits in NICA registers. Assume A is of size K by L, L is the middle dimension of the problem. Then, the above computing amounts to doing a rank-L update on the C matrix. This can be done in L steps. For each rank-1 update, we need one column of the A matrix (K elements) and one row of the B matrix (P elements). These K+P elements are brought into NICA and used to generate $2*P*K$ flops. The flops to data ratio for this problem is $2g(1/K+1/P)$. If both K and P are large, this becomes a very compute intensive problem. The memory BW between NICA and the system must be large enough to support (K+P) data transfers while doing $2*K*P$ flops. Assuming that $2*K$ fops can be done in one cycle, we need data transfer rate of at least $(1+K/P)$ elements per cycle. This does not take into account initial loading and final storing of the C matrix. If L is large, this extra overhead becomes small.

We have looked at many other important computing kernels such as one and multi-dimensional FFTs, convolution/correlation of multiple sequences, 3-D migration in seismic processing, etc. All these applications can get large performance gains from NICA. Solving equations of various kinds such as general dense, positive definite symmetric, complex symmetric, band (with bandwidths, of the order of VSS or longer), skyline, etc. can all be implemented on NICA mith close to peak performance. LINPACK TPP benchmark which solves a general dense system of equations (of size 1000 or higher) will also get close to the peak performance. This is a very important supercomputing benchmark and super-computers are often compared on this basis.

Another trend in large scale scientific computing is towards very large sparse system of equations. Often direct methods a reused to solve these problems. Direct sparse methods can be formulated in terms of sparse BLAS-3 (currently standards activities are going on to define these BLAS). Sparse BLAS-3 in turn can be blocked for NICA. The sparse matrix can be rearranged so that a set of rows and columns (not necessarily contiguous) are extracted from the matrix in such way that the extracted block looks fairly dense. The entire sparse matrix can be represented as a linear sum of a set of these blocks and other structures (such as bands of diagonals). These can then be transferred to NICA vector registers as dense blocks and used many times.

High performance graphics also tend to have high FDR and are vectorizable. These applications can also benefit from NICA.

While the present invention has been shown and described with respect to the specific embodiments, it will be understood that it is not thus limited. Numerous modifications, changes and improvements will occur which fall within the scope and spirit of the invention.

We claim:

1. A computing processor having a processor cycle time comprising:

K RISC processing elements wherein K>1;

each of said K RISC processing elements comprising:

means for storing N words where N>1; and an arithmetic unit;

an Ith vector is provided by a group of K words of said K RISC processing elements, each of said Ith vectors has K storage locations, said Ith vector has vector length K wherein $1 \leq I \leq N$ thereby, providing N vectors of K elements;

said K RISC processing elements providing means for performing at a predetermined cycle time a vector operation on at least one of said N vectors and storing the results of said operation in one of said N vectors, wherein said vector operation is performed by said K arithmetic units substantially simultaneously for all of said K elements of said at least one of said N vectors;

means for performing another vector operation in said K RISC processing elements in the next cycle time after said predetermined cycle time.

2. A computing processor according to claim 1, wherein each of said N registers has M bit storage locations wherein M>0.

3. A computing processor according to claim 1, wherein said means for performing a vector operation is a first arithmetic unit.

4. A computing processor according to claim 1, wherein said means for performing another vector operation is a another arithmetic unit.

5. A computing processor according to claim 1, wherein said means for performing a vector operation is a first arithmetic unit and said means for performing another vector operation is a second arithmetic unit.

6. A computing processor according to claim 1, further including a matrix control unit.

7. A computing processor according to claim 6, further including at least one data bus connecting said matrix control unit to said K processing elements.

8. A computing processor according to claim 6, further including a commands bus connecting said matrix control unit to said K processing elements.

9. A computing processor according to claim 8, further including at least one data bus connecting said matrix control unit to said K processing elements.

10. A computing processor according to claim 9, wherein said at least one data bus is shared by more than one of said K processing elements.

11. A computing system having a cycle time comprising:

a main memory;

a cache memory;

a storage control unit;

a central processing unit;

a matrix processing unit;

a matrix instruction bus for transferring instructions from said central processing unit to said matrix processing unit;

a central processing unit data bus for transferring data from said cache to said matrix processing unit;

said central processing unit is coupled to said main memory through said storage control unit and said cache memory;

a matrix control unit is coupled to said main memory through said cache memory;

a storage control unit is connected to said main memory by a memory address bus;

said storage control unit is connected to said central processing unit by a first data bus;

said cache memory is connected to said matrix processing unit by second data bus;

said matrix processing unit comprising a means for performing a subsequent vector operation within one cycle of said cycle time of a preceding vector operation;

K RISC processing elements wherein K>1;

each of said K RISC processing elements comprising:
means for storing N words wherein N>1; and
an arithmetic unit;

an Ith vector is provided by a group of K words of said K RISC processing elements, each of said Ith vectors has K storage locations, said Ith vector has vector length K wherein $1 \leq I \leq N$, thereby providing N vectors of K elements;

said K RISC processing elements providing a means for performing at a predetermined cycle time a vector operation on at least one of said N vectors and storing the results of said operation in one of said N vectors, wherein said vector operation is performed by said K arithmetic units substantially simultaneously for all of said K elements of said at least one of said N vectors;

means for performing another vector operation in said K RISC processing elements in the next cycle time after said predetermined cycle time.

12. A computing system having a cycle time comprising:

a main memory;

a cache memory;

a storage control unit;

a central processing unit;

a matrix processing unit;

a matrix instruction bus for transferring instructions from said central processing unit to said matrix processing unit;

a central processing unit data bus for transferring data from said cache to said matrix processing unit;

said central processing unit is coupled to said main memory through said storage control unit and said cache memory;

said matrix processing unit is coupled to said main memory through said cache memory;

said storage control unit is connected to said main memory by a memory address bus;

said storage control unit is connected to said central processing unit by a first data bus;

said cache memory is connected to said matrix processing unit by second data bus;

said matrix processing unit comprising:
K RISC processing elements wherein K>1;
each of said K RISC processing elements comprising:
means for storing N words wherein N>1; and
an arithmetic unit;

an Ith vector is provided by a group of K words of said K RISC processing elements, each of said Ith vectors has K storage locations for said Ith vector has vector length K wherein $1 \leq I \leq N$, thereby providing N vectors of K elements;

said K RISC processing elements providing a means for performing at a predetermined cycle time a vector operation on at least one of said N vectors and storing the results of said operation in one of said N vectors, wherein said vector operation is performed by said K arithmetic units substantially simultaneously for all of said K elements of said at least one of said N vectors;

each of said N vectors has the same length K;

means for performing another vector operation in said K RISC processing elements in the next cycle time after said predetermined cycle time.

13. A computing processor according to claim 12, further including:

a matrix control unit;

a command bus connecting said matrix control unit to said K processing elements; and at least one data bus connecting said matrix control unit to said K processing elements.

14. A computing system having a cycle time comprising:

a main memory;

a RISC central processing unit;

a matrix processing unit;

a matrix instruction bus for transferring instructions from said central processing unit to said matrix processing unit;

a central processing unit data bus for transferring data from said main memory to said matrix processing unit;

said central processing unit is connected to said main memory by a first data bus;

said matrix control unit is connected to said main memory by a second data bus;

said storage control unit is connected to said main memory by a memory address bus;

said matrix processing unit comprising a means for performing a subsequent vector operation within one cycle of said time of a preceding vector operation;

K RISC processing elements wherein K>1;

each of said K RISC processing elements comprising:
means for storing N words wherein N>1; and
an arithmetic unit;

an Ith vector is provided by a group of K words of said K RISC processing elements, each of said Ith vectors has K storage locations for an Ith vector of vector length K wherein $1 \leq I \leq N$; thereby providing N vectors of each elements;

each of said N vectors has the same length;

said K RISC processing elements providing a means for performing at a predetermined cycle time a vector operation on at least one of said N vectors and storing the results of said operation in one of said one vectors, wherein said vector operation is performed by said K arithmetic units substantially simultaneously for all of said K elements of said at least one of said N vectors;

means for performing another vector operation in said K RISC processing elements in the next cycle time after said predetermined cycle time.

15. A computing system having a cycle time comprising:

a main memory;

a central processing unit;

a matrix processing unit;

a matrix instruction bus for transferring instructions from said central processing unit to said matrix processing unit;

a central processing unit data bus for transferring data from said main memory to said matrix processing unit;

said central processing unit is connected to said main memory by a first data bus;

said matrix control unit is connected to said main memory by a second data bus;

said storage control unit is connected to said main memory by a memory address bus;

said matrix processing unit comprising a means for performing a subsequent vector operation within one cycle of said time of a preceding vector operation;

K processing elements wherein K>1;

each of said K processing elements comprising:
means for storing N words wherein N>1; and
an arithmetic unit;

an Ith vector is provided by a group of K words of said K RISC processing elements, each of said Ith vectors has K storage locations for an Ith vector of vector length K wherein $1 \leq I \leq N$; thereby providing N vectors;

means for performing at a predetermined cycle time a vector operation on at least one of said N vectors and storing the results of said operation in one of said one vectors, wherein said vector operation is performed by said K arithmetic units substantially simultaneously for all of said K elements of said at least one of said N vectors;

means for performing another vector operation in said K RISC processing elements in the next cycle time after said predetermined cycle time.

16. A computing processor according to claims 1, 11, 12, or 15, wherein each of said N vectors has the same length K.

* * * * *